(12) United States Patent
Mizuno et al.

(10) Patent No.: US 10,135,054 B2
(45) Date of Patent: *Nov. 20, 2018

(54) BATTERY SEPARATOR AND MANUFACTURING METHOD THEREOF

(71) Applicant: TORAY INDUSTRIES, INC., Tokyo (JP)

(72) Inventors: Naoki Mizuno, Nasushiobara (JP); Koichi Matano, Nasushiobara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/110,389

(22) PCT Filed: Dec. 16, 2014

(86) PCT No.: PCT/JP2014/083302
§ 371 (c)(1),
(2) Date: Jul. 7, 2016

(87) PCT Pub. No.: WO2015/104964
PCT Pub. Date: Jul. 16, 2015

(65) Prior Publication Data
US 2016/0336569 A1    Nov. 17, 2016

(30) Foreign Application Priority Data
Jan. 10, 2014   (JP) .................. 2014-003320

(51) Int. Cl.
| | | |
|---|---|---|
| *H01M 2/16* | (2006.01) | |
| *H01M 2/14* | (2006.01) | |
| *H01M 10/0525* | (2010.01) | |
| *B32B 27/32* | (2006.01) | |
| *B32B 27/08* | (2006.01) | |
| *B32B 27/20* | (2006.01) | |
| *B32B 3/26* | (2006.01) | |
| *B29C 47/00* | (2006.01) | |
| *B29C 47/88* | (2006.01) | |

(52) U.S. Cl.
CPC ....... *H01M 2/1686* (2013.01); *B29C 47/0021* (2013.01); *B29C 47/0057* (2013.01); *B29C 47/886* (2013.01); *B29C 47/8845* (2013.01); *B32B 3/266* (2013.01); *B32B 27/08* (2013.01); *B32B 27/20* (2013.01); *B32B 27/32* (2013.01); *H01M 2/145* (2013.01); *H01M 2/166* (2013.01); *H01M 10/0525* (2013.01); *B32B 2264/102* (2013.01); *B32B 2264/104* (2013.01); *B32B 2307/7242* (2013.01); *B32B 2457/10* (2013.01)

(58) Field of Classification Search
CPC .......... C08J 5/18; C08J 7/047; C08J 2323/06; C08J 2427/16; B29C 47/0021; B29C 47/06; B29C 47/0057; B29C 47/0004; B29C 37/0025; B29C 47/8895; B29C 47/8845; H01M 2/145; H01M 10/0525; H01M 2/1653; B29K 2995/0007; B29K 2105/04; B29K 2023/06; B29L 2031/3468; B29L 2009/005
See application file for complete search history.

(56) References Cited

U.S. PATENT DOCUMENTS

2010/0129720 A1*  5/2010  Sako ................... H01M 2/1653
                                                             429/246
2014/0315065 A1   10/2014  Mizuno et al.

FOREIGN PATENT DOCUMENTS

| EP | 2750216 A1 | 7/2014 |
|---|---|---|
| JP | 49075666 A | 7/1974 |
| JP | 56069120 A | 6/1981 |
| JP | 3065775 B | 10/1991 |
| JP | 4460028 B2 | 5/2010 |
| JP | 2011-000832 A | 1/2011 |
| JP | 2012-043762 A | 3/2012 |
| JP | 4931083 B | 5/2012 |
| JP | 5296917 B1 | 9/2013 |
| JP | 2014-102882 A | 6/2014 |
| KR | 101378051 B1 | 3/2014 |
| WO | 2009/044227 A1 | 4/2009 |
| WO | 2010-104127 A | 9/2010 |
| WO | 2014-175050 A1 | 10/2010 |
| WO | 2014-076994 A1 | 5/2014 |
| WO | 2014-132791 A1 | 9/2014 |

OTHER PUBLICATIONS

International Search Report for PCT/JP2014/083302, dated Feb. 3, 2015, 2 pages.
Extended European Search Report dated Sep. 18, 2017 in European Patent Application No. 14878371.5, 8 pages.

* cited by examiner

*Primary Examiner* — Muhammad S Siddiquee
(74) *Attorney, Agent, or Firm* — Kilpatrick Townsend and Stockton LLP

(57) ABSTRACT

A battery separator is disclosed. The battery separator includes a polyolefin porous membrane which has a plurality of protrusions including a polyolefin. The protrusions are interspersed randomly on at least one surface of the polyolefin porous membrane at a density of not less than 3 protrusions/cm2 and not greater than 200 protrusions/cm2. The protrusions have a size W, where 5 μm≤W≤50 μm, and the protrusions have a height H, where 0.5 μm≤H. The battery separator also includes a modified porous layer, including a fluorine-based resin, and a plurality of inorganic particles laminated on the at least one surface of the polyolefin porous membrane. A concentration of the inorganic particles is not less than 40 wt. % and is less than 80 wt. %.

4 Claims, 2 Drawing Sheets

BATTERY SEPARATOR AND MANUFACTURING METHOD THEREOF

CROSS-REFERENCE TO RELATED APPLICATIONS

This application is a United States National Phase Application of co-pending International Patent Application Number PCT/JP2014/083302, filed Jul. 10, 2016 and entitled "BATTERY SEPARATOR AND MANUFACTURING METHOD THEREOF", which Application claims priority to Japanese Patent Application Number 2014-003320, filed with the Japanese Patent Office on Jan. 10, 2014, the contents of which are incorporated herein by reference in their entirety.

TECHNICAL FIELD

The present invention relates to a battery separator having at least a polyolefin porous membrane that is suitable for laminating a modified porous layer, and a modified porous layer having excellent electrode adhesion. In particular, the battery separator is useful as a lithium-ion battery separator.

BACKGROUND ART

Microporous membranes comprising thermoplastic resins are used widely as a film for separation, selective permeation, or isolation of substances, and the like. For example, the usage includes battery separators for lithium ion rechargeable batteries, nickel-metal hydride batteries, nickel-cadmium batteries, or polymer batteries, separators for electric double-layer capacitors, various filters such as reverse osmosis filtration membranes, ultrafiltration membranes, microfiltration membranes and the like, moisture permeation waterproof clothes, medical materials and the like. In particular, a polyethylene porous membrane which exhibits ion permeability due to electrolytic solution impregnation, excellent electrical insulating properties, and a pore blocking effect, which blocks an electrical current to prevent an excessive temperature increase at a temperature of approximately 120 to 150° C. at the time of an abnormal temperature increase in a battery, is suitably used as a lithium ion rechargeable battery separator. However, if the temperature continues to increase even after the pore blocking for some reason, the membrane may be punctured due to the shrinkage of the membrane. This phenomenon is not limited to polyethylene porous membranes. Even in the case of a porous membrane using another thermoplastic resin, this phenomenon cannot be avoided at a temperature equal to or above the melting point of the resin constituting the porous membrane.

In particular, separators for lithium-ion batteries greatly affect battery characteristics, battery productivity and battery safety, and require good mechanical properties, heat resistance, permeability, dimensional stability, pore blocking characteristics (shutdown characteristics), membrane melt-puncture characteristics (melt-down characteristics) and the like. Furthermore, they require improved adhesion between a separator and an electrode material for an improvement in the cycle characteristics of batteries and improved electrolyte permeability for an improvement in productivity. For this purpose, research has been conducted to laminate various modified porous layers on porous membranes. Polyamideimide resins, polyimide resins, and polyamide resins, which have both good heat resistance and good electrolyte permeability, fluorine-based resins, which exhibit good electrode adhesion, and the like are preferably used as resins constituting modified porous layers. A modified porous layer described in the present invention refers to a layer that contains a resin which provides or improves at least one of the functions among oxidation resistance, adhesion to an electrode material, electrolyte permeability and the like.

Patent Document 1 discloses a composite porous membrane having a peel strength (T-peel strength) of from 1.0 to 5.3 N/25 mm at the interface between a polyethylene porous membrane and a coating layer. The membrane was produced by applying a varnish of polyvinylidene fluoride and inorganic particles (mass ratio: 15:85) to a polyethylene porous membrane having a thickness of 9 μm and allowing a portion of the polyvinylidene fluoride to moderately penetrate into the fine pores of the polyethylene porous membrane so as to exhibit an anchor effect.

Patent Document 2 discloses a separator having a heat-resistant porous layer containing a self-crosslinking acrylic resin and a plate-like boehmite provided on a corona discharge-treated polyethylene porous membrane with a thickness of 16 The resultant separator exhibited the peel strength (T-peel strength) of 1.1 to 3.0 N/10 mm at 180° between the polyethylene porous membrane and the heat-resistant porous layer.

In Working Example 1 of Patent Document 3, a polyethylene resin solution comprising: 50 parts by mass of a composition containing 47.5 parts by mass of polyethylene having a viscosity-average molecular weight (Mv) of 200,000, 2.5 parts by mass of polypropylene having an Mv of 400,000, and an antioxidant; and 50 parts by mass of liquid paraffin; is extruded from an extruder at 200° C. and withdrawn with a cooling roller kept at 25° C. to obtain a gel-like molded product, and the product is then stretched biaxially 7×6.4 times to obtain a polyolefin resin porous membrane. A multi-layer porous membrane obtained by laminating a coating layer that comprises polyvinylalcohol and alumina particles on the surface of the polyolefin resin porous membrane is disclosed.

In Working Example 6 of Patent Document 4, a polyethylene resin solution that comprises: 30 wt. % of a composition including polyethylene resins having a weight average molecular weight (Mw) of 4,150,000 and an Mw of 560,000, respectively, and a weight ratio of 1:9; and 70 wt. % of a mixed solvent of liquid paraffin and decalin; is extruded from an extruder at 148° C. and cooled in a water bath to obtain a gel-like molded product, and the product is then stretched biaxially 5.5×11.0 times to obtain a polyolefin resin porous membrane. A non-aqueous separator for a rechargeable battery obtained by laminating a coating layer that comprises meta-type all-aromatic polyamide and alumina particles on the surface of the polyethylene porous membrane is disclosed.

In Working Example 1 of Patent Document 5, 47 parts by mass of a homopolymeric polyethylene having a viscosity-average molecular weight (Mv) of 700,000, 46 parts by mass of a homopolymeric polyethylene having an Mv of 250,000, and 7 parts by mass of a homopolymeric polyethylene having an Mv of 400,000 were dry-blended using a tumbler blender. This example discloses a porous membrane obtained by: adding 1 wt. % of pentaerythrityl-tetrakis-[3 (3,5-di-t-butyl-4-hydroxyphenyl)propionate] as an anti-oxidant to 99 wt. % of the obtained pure polymer mixture; melt-kneading the dry blended polyethylene composition once again using a tumbler blender; extruding and casting the composition onto a cooling roller controlled to a surface temperature of 25° C. so as to obtain a sheet-like polyolefin composition having a thickness of 2000 μm; biaxially stretching the polyolefin composition 7×7 times so as to obtain a polyethylene porous membrane; and applying an aqueous dispersion of baked kaolin and latex to the resultant polyethylene porous membrane.

CITATION LIST

Patent Literature

Patent Document 1: Japanese Unexamined Patent Application Publication No. 2012-043762
Patent Document 2: Re-publication of PCT International Publication No. 2010-104127A
Patent Document 3: Japanese Patent No. 4931083B
Patent Document 4: Japanese Patent No. 4460028B
Patent Document 5: Japanese Unexamined Patent Application Publication No. 2011-000832

SUMMARY OF INVENTION

One inventive aspect is a battery separator. The battery separator includes a polyolefin porous membrane which has a plurality of protrusions including a polyolefin. The protrusions are interspersed randomly on at least one surface of the polyolefin porous membrane at a density of not less than 3 protrusions/cm$^2$ and not greater than 200 protrusions/cm$^2$. The protrusions have a size W, where 5 μm≤W≤50 and the protrusions have a height H, where 0.5 μm≤H. The battery separator also includes a modified porous layer, including a fluorine-based resin, and a plurality of inorganic particles laminated on the at least one surface of the polyolefin porous membrane. A concentration of the inorganic particles is not less than 40 wt. % and is less than 80 wt. %. Another inventive aspect is a method of manufacturing a battery separator. The method includes preparing a polyethylene resin solution by adding a forming solvent to a polyethylene resin and subsequently melt-kneading the solution, forming a gel-like molded product by extruding the polyethylene resin solution through a die, cooling the extrudate with a cooling roller, and removing the forming solvent from a surface of the cooling roller. The method also includes forming a stretched and molded material by stretching the gel-like molded product in a machine direction and in a width direction, forming a porous molded material by extracting and removing the forming solvent from the stretched and molded material followed by drying the molded material, forming a polyolefin porous membrane by treating the porous molded material with heat, and using a coating solution containing a fluorine-based resin, inorganic particles, and a solvent capable of dissolving or dispersing the fluorine-based resin to form. The method also includes forming a laminated film on a surface of the polyolefin porous membrane, where the surface of the polyolefin porous membrane is in contact with the cooling roller, and drying the laminated film.

Technical Problem

In the future, it will be necessary to increase the area not only of an electrode but also of a separator to fill a container in order to increase battery capacity, and it is expected that the film thickness will be reduced even further. However, since a thinner porous membrane may experience deformation in its planar direction, a modified porous layer laminated on a thin porous membrane in a battery separator may delaminate during processing, in the slit process, or in the battery assembly process, and the safety may be compromised.

In order to accommodate cost reductions, it is anticipated that the speed of the battery assembly process will be increased. In order to obtain a separator which involves minimal trouble such as the peeling of the modified porous layer even in such high-speed processing, there is a demand for high adhesion between the polyolefin porous membrane and the modified porous layer, capable of withstanding high-speed processing. On the other hand, there is a problem that when the resin included in the modified porous layer is sufficiently permeated into the polyolefin porous membrane serving as a substrate in order to improve the adhesion, the degree of increase in air permeation resistance becomes large.

These conventional arts described above will not sufficiently ensure safety due to partial delamination of the modified porous layers during the slit process or the battery assembly process, in response to demands for increased processing speed or reduced separator thickness, as anticipated by the lower cost and higher capacity in the near future. In particular, when the polyolefin resin porous membrane serving as a substrate becomes thinner, it becomes more difficult to ensure safety sufficiently since it is more difficult to achieve enough anchoring of modified porous layers to the polyolefin resin porous membrane.

Considering a scenario in which battery separators require increasingly thinner materials and lower costs in the future, the present inventors aimed to provide a battery separator having an extremely high peel strength between the polyolefin porous membrane and the modified porous layer, so that the modified porous layer is unlikely to peel even in high-speed processing during the slit process or the battery assembly process, and also having excellent adhesion with electrodes.

The peel strength between a polyolefin porous membrane and a modified porous layer described in the present disclosure is a value obtained from the measurement described below (in some cases, it is also referred to as 0° peel strength).

FIG. 1 is a schematic side view of a laminated sample of a polyolefin porous membrane and a modified porous layer under tension provided by a tensile tester (not illustrated). The reference numeral 1 denotes a laminated sample, 2 denotes a polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, 50 mm×25 mm in size and 0.5 mm in thickness, the double-sided adhesive tape 4 of the same size is adhered. The surface of the polyolefin porous membrane 2 side of the sample 1 (laminated polyolefin porous membrane), cut out in the size of 50 mm in width and 100 mm in length, is adhered on the aluminum plate 5, so that the 40 mm portion of the sample, measured from one of the 25 mm long edges of the aluminum plate 5, is overlapped and adhered together, while the protruded portion is cut out. Next, a double-sided adhesive tape is adhered on one side of the aluminum plate 5', 100 mm in length, 15 mm in width and 0.5 mm in thickness. And the 20 mm portion of the sample, measured from one of the 25 mm long edges of the aluminum plate 5, is overlapped and adhered together. Then, using the tensile tester, the load is applied on the aluminum plate 5 and the aluminum plate 5' in parallel but in opposite directions, at a tensile velocity of 10 mm/min, and the strength at which the modified porous layer is delaminated is measured. When the peel strength measured by this evaluation method is not less than 130 N/15 mm, then there will be few incidents of delamination of the laminated modified porous layer during the transportation and the processes, even if the thickness of the polyolefin porous membrane is not greater than 10 μm.

T-peel strength or 180° peel strength, both of which are conventionally used for peel strength measurement, is the peel force required to peel off the coating layer from the polyethylene porous membrane in the direction perpendicular or from perpendicular to diagonally backward, to the polyethylene porous membrane surface. Compared to these conventional evaluation methods, this evaluation method may provide the better evaluation in relation to the actual scratch resistance during the slit process and the battery assembly process.

Solution to Problem

In order to solve the problems described above, the present invention has the following constitution.

(1) A battery separator comprising at least a polyolefin porous membrane and a modified porous layer; the polyolefin porous membrane having protrusions made of a polyolefin interspersed randomly on at least one surface at a density of not less than 3 protrusions/cm$^2$ and not greater than 200 protrusions/cm$^2$, the protrusions satisfying 5 μm≤W≤50 μm (W being a size of the protrusion) and 0.5 μm≤H (H being a height of the protrusion); and the modified porous layer containing a fluorine-based resin and inorganic particles laminated on a surface of the polyolefin porous membrane, where the surface has the protrusions; a content of the inorganic particles relative to a total of the fluorine-based resin and the inorganic particles of the modified porous layer being not less than 40 wt. % and less than 80 wt. %.

(2) The battery separator according to (1), in which a thickness of the polyolefin porous membrane is not greater than 25 μm.

(3) The battery separator according to (1) or (2), in which the inorganic particles include at least one type selected from the group consisting of calcium carbonate, alumina, titania, barium sulfate, and boehmite.

(4) The battery separator according to any one of (1) to (3), in which the battery separator is used as a lithium ion rechargeable battery separator.

(5) A method of manufacturing a battery separator according to any one of (1) to (4) comprising the following steps:
(a) preparing a polyethylene resin solution by adding a forming solvent to a polyethylene resin and then melt-kneading the solution;
(b) forming a gel-like molded product by extruding the polyethylene resin solution through a die and cooling the extrudate with a cooling roller having a surface with the forming solvent thereon removed;
(c) stretching the gel-like molded product in a machine direction and in a width direction to obtain a stretched and molded material;
(d) extracting and removing the forming solvent from the stretched and molded material, followed by drying to obtain a porous molded material;
(e) treating the porous molded material by heat to obtain a polyolefin porous membrane; and
(f) forming a laminated film on a surface of the polyolefin porous membrane, the surface being in contact with the cooling roller, using a coating solution containing a fluorine-based resin, inorganic particles, and a solvent capable of dissolving or dispersing the fluorine-based resin, and drying the laminated film.

(6) A method of manufacturing a battery separator according to (5), in which means for removing the forming solvent in step (b) is a doctor blade.

Advantageous Effects of Invention

The present invention provides a laminated porous membrane comprising at least a polyolefin porous membrane and a modified porous layer, in which the polyolefin membrane has excellent adhesion to a modified porous layer, and a battery separator using the laminated porous membrane in which peeling is unlikely to occur even at the time of high-speed transport and which has excellent adhesion with electrodes.

DESCRIPTION OF EMBODIMENTS

Figure 1:
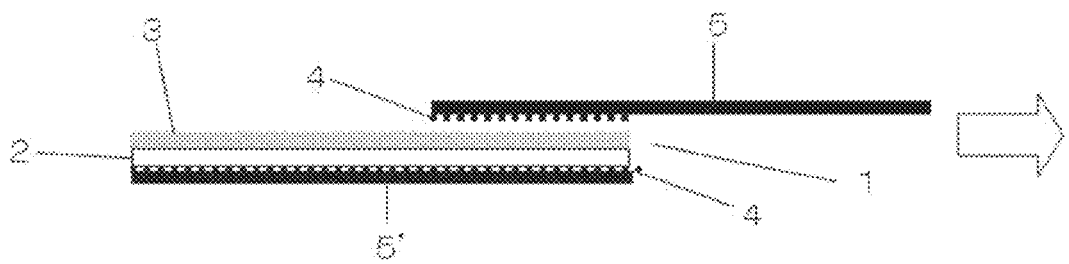
FIG. 1 is a schematic view of the measurement method for 0° peel strength.

The polyolefin porous membrane used in the present invention is a polyolefin porous membrane obtained by preparing a specific polyolefin resin solution and precisely controlling the cooling rate of the polyolefin resin solution extruded from an extruder through a die, the polyolefin porous membrane having protrusions of appropriate shape and number on the surface thereof. Further, by laminating a modified porous layer on the polyolefin porous membrane, where the content of inorganic particles relative to the total of a fluorine-based resin and inorganic particles is not less than 40 wt. % and less than 80 wt. % in the modified porous layer, it is possible to achieve excellent peel strength between the polyolefin porous membrane and the modified porous layer and to obtain a battery separator having excellent electrode adhesion.

Protrusions described in the present invention are fundamentally different from those obtained by adding inorganic particles, for example, to a polyolefin porous membrane. The protrusions obtained by adding inorganic particles to a polyolefin porous membrane are usually very low in their height, and forming the protrusions with height not less than 0.5 μm by such a method would require particles with diameters equal to or greater than the thickness of the polyolefin porous membrane. However, addition of such particles would decrease the strength of the polyolefin porous membrane and is unrealistic.

The protrusions described in the present invention is obtained by growing the parts of the polyolefin porous membrane to appropriate shapes, and do not degrade the basic properties of the polyolefin porous membrane.

In addition, the randomly disposed protrusions described in the present invention are clearly different from the patterned or periodic arrangement of protrusions obtained by the process of an embossing roll before or after the stretching process during the manufacturing of the polyolefin porous membrane. In principle, press working such as embossing forms protrusions by compressing the parts other than the protrusions, is not preferable due to possible decrease in air permeation resistance and in electrolyte permeability.

The protrusions with appropriate size described in the present invention are not less than 5 and not greater than 50 μm in size, and are not less than 0.5 μm in height. Namely, 5 μm≤W≤50 μm, where W is the protrusion size, and 0.5 μm≤H, where H is the protrusion height. Such protrusions function as anchors upon laminating the modified porous layer on the porous membrane, and a laminated porous membrane with a large 0° peel strength described above can be obtained as a result. Meanwhile, the upper limit of the height is not particularly limited, but the height of 3.0 μm may be sufficient. Greater population of protrusions with sufficient height is likely to increase the 0° peel strength described above. Namely, 0° peel strength is influenced by the number and the average height of protrusions with height not less than 0.5 The lower limit of the number of the protrusions is 3 protrusions/cm$^2$, preferably 5 protrusions/cm$^2$, and more preferably 10 protrusions/cm$^2$. The upper limit of the number of the protrusions is 200 protrusions/cm$^2$, and preferably 150 protrusions/cm$^2$. The lower limit of the height of the protrusions is 0.5 preferably 0.8 and more preferably 1.0 Size and height of the protrusions in the present invention are values measured by the measurement method described below.

The increase in air permeation resistance described in the present invention is the difference between the air permeation resistance of the polyolefin porous membrane serving as a substrate and the air permeation resistance of the laminated porous membrane on which the modified porous layer is laminated, and the increases is preferably not more than 100 sec/100 ccAir.

An overview of the laminated porous membrane of the present invention having at least a polyolefin porous membrane and a modified porous layer and the laminated porous membrane used as a battery separator will be given hereinafter, but the present invention is not, of course, limited to these representative examples.

1. Polyolefin Porous Membrane

First, the polyolefin porous membrane of the present invention will be described. The thickness of the polyolefin porous membrane of the present invention is preferably not greater than 25 and the upper limit is preferably 20 μm and more preferably 16 The lower limit is preferably 7 μm and more preferably 9 When the thickness of the polyolefin porous membrane is in the preferable ranges described above, practical membrane strength and pore blocking function can be achieved, the area in the unit volume of the battery case is not restricted and it is suitable for increase in battery capacity expected in the future.

The upper limit of the air permeation resistance of the polyolefin porous membrane is preferably 300 sec/100 ccAir, more preferably 200 sec/100 ccAir, and even more preferably 150 sec/100 ccAir, while the lower limit is preferably 50 sec/100 ccAir, more preferably 70 sec/100 ccAir, and even more preferably 100 sec/100 ccAir.

The upper limit of the porosity of the polyolefin porous membrane is preferably 70%, more preferably 60%, and even more preferably 55%. The lower limit is preferably 30%, more preferably 35%, and even more preferably 40%.

When air permeation resistance and porosity are in the preferable ranges described above, sufficient battery charge/discharge characteristics, especially sufficient ion permeability (charge/discharge operating voltage) and life of a battery (closely related to the amount of an electrolytic solution to be retained) are achieved, functions as a battery may be sufficiently exhibited and sufficient mechanical strength and insulation may reduce the possibility of shorting during charge/discharge.

Since the average pore size in the polyolefin porous membrane affects pore blocking characteristics greatly, the average pore size is preferably from 0.01 to 1.0 μm, more preferably from 0.05 to 0.5 μm, and even more preferably from 0.1 to 0.3 μm. When the average pore size in the polyolefin porous membrane is in the preferable ranges described above, the sufficient 0° peel strength of the modified porous layer described above can be achieved due to the anchor effect of the functional resin, the air permeation resistance may not be significantly deteriorated upon laminating the modified porous layer, the response of the pore blocking phenomenon to the temperature may not slow down and pore blocking temperature associated with the rate of temperature increase may not shift to higher temperature.

It is necessary for a polyolefin porous membrane to possess the function in which the pores are blocked in the case of abnormal charge/discharge reactions. Therefore, the melting point (softening point) of the configured resins is preferably from 70 to 150° C., more preferably from 80 to 140° C., and even more preferably 100 to 130° C. If the melting point of the configured resin is within the preferred range described above, erroneous battery shutdown due to pore blocking function during the normal operation can be avoided and safety is ensured by the pore blocking function in the event of abnormal reaction.

A polyethylene or polypropylene is preferable as the polyolefin resin that constitutes the polyolefin porous membrane. Additionally, the polyolefin resin can be a single component, a mixture of two or more kinds of different polyolefin resins, for example a mixture of polyethylene and polypropylene, or copolymer of different olefins. They possess pore blocking effect that blocks electrical current and prevents excessive temperature increase upon abnormal temperature increase in batteries, in addition to basic properties such as electrical insulating properties, ion permeability and the like. Among these, polyethylene is more preferable from the point of view of good pore blocking characteristics.

Details are discussed below with polyethylene as a polyolefin resin used in the present invention.

Polyethylene includes ultra-high molecular weight polyethylene, high density polyethylene, medium-density polyethylene, low density polyethylene and the like. Additionally, polymerization catalysts are not limited, and include Ziegler-Natta catalyst, Phillips catalyst, metallocene catalyst and the like. These polyethylenes may be not only a homopolymer of ethylene, but also a copolymer that contains small amount of another α-olefin. Suitable examples of α-olefins other than ethylene include propylene, 1-butene, 1-pentene, 1-hexene, 4-methyl-1-pentene, 1-octene, (meth) acrylic acid, (meth)acrylic acid esters, styrene and the like.

Polyethylene may be a single component, but preferably be a mixture of two or more kinds of polyethylene. As a polyethylene mixture, a mixture of two or more types of ultra-high molecular weight polyethylene with different weight average molecular weights (Mw), or a mixture of similar high density polyethylenes, medium-density polyethylenes, and low-density polyethylenes may be used. In addition, a mixture of two or more types of polyethylenes selected from the group consisting of ultra-high molecular weight polyethylenes, high-density polyethylenes, medium-density polyethylenes, and low-density polyethylenes may be used.

As a polyethylene mixture, a mixture of an ultra-high molecular weight polyethylene with a weight average molecular weight (Mw) of not less than $5 \times 10^5$ and polyethylene with an Mw of not less than $1 \times 10^4$ and less than $5 \times 10^5$ is preferred. The Mw of the ultra-high molecular weight polyethylene is preferably from $5 \times 10^5$ to $1 \times 10^7$, more preferably from $1 \times 10^6$ to $15 \times 10^6$, and even more preferably from $1 \times 10^6$ to $5 \times 10^6$. As the polyethylene with an Mw of not less than $1 \times 10^4$ and less than $5 \times 10^5$, any one of high-density polyethylene, medium-density polyethylene or low-density polyethylene can be used, but high-density polyethylene is particularly preferably used. As the polyethylene with an Mw of not less than $1 \times 10^4$ and less than $5 \times 10^5$, two or more types of polyethylene with different Mw may be used, or two or more types of polyethylene with different densities may be used. Setting the upper limit of the Mw of the polyethylene mixture to not greater than $15 \times 10^6$ facilitates melt-extrusion.

The upper limit of the content of the ultra-high molecular weight polyethylene is preferably 40 wt. %, more preferably 30 wt. %, and even more preferably 10 wt. %, and the lower limit is preferably 1 wt. %, more preferably 2 wt. %, and even more preferably 5 wt. %. If the content of ultra-high molecular weight polyethylene is within the preferable range, protrusions with sufficient height can be obtained. These protrusions function as anchors upon laminating a modified porous layer, resulting in exceptionally large peel resistance against a force applied parallel to the planar directions of the polyethylene porous membrane. Also, even when the polyethylene porous membrane thickness is reduced, sufficient tensile strength can be obtained. Preferably, tensile strength is not less than 100 MPa. The upper limit is not particularly defined.

Figure 2:
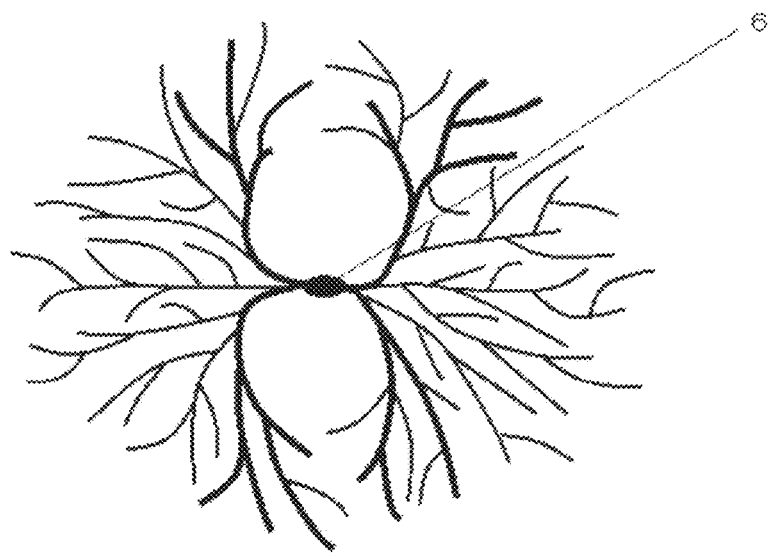
FIG. 2 is a schematic view illustrating a spherulite structure and a spherulite nucleus of polyethylene in the polyethylene porous membrane.
Figure 3:
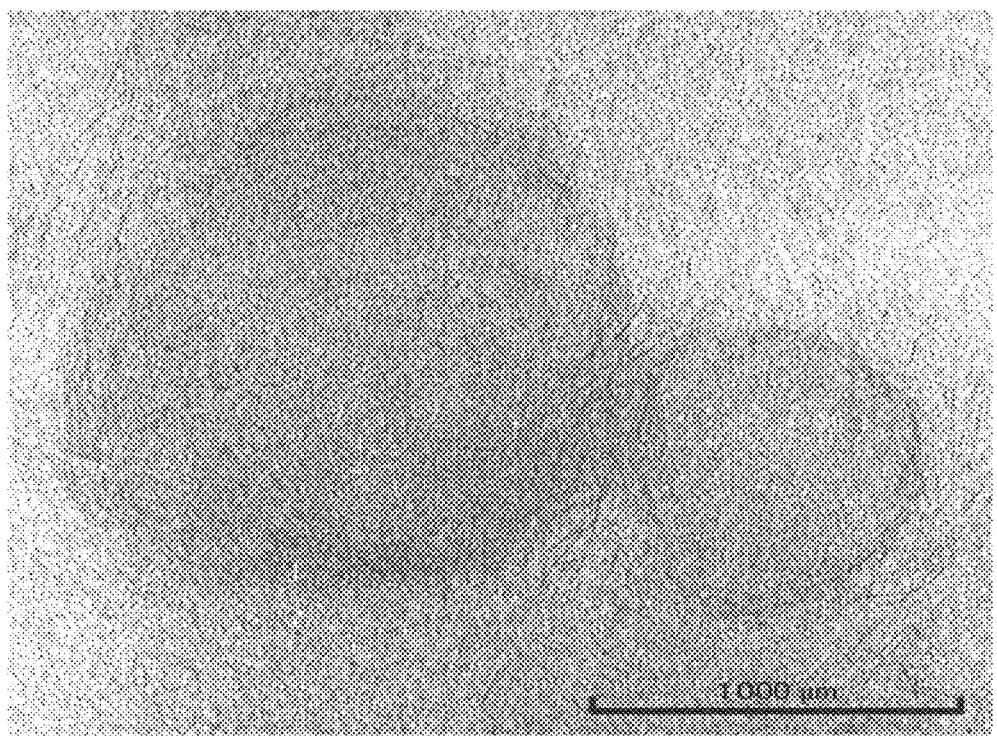
FIG. 3 is a micrograph of a ring-shaped mark on the polyethylene porous membrane, originating from the spherulite of polyethylene.

The inventors of the present invention consider the mechanism of protrusion formation as described in the present invention as follows. Crystallization of polyethylene begins simultaneously as extrusion of melt polyethylene resin and a forming solvent through the die, and the rate of crystallization increases due to rapid quenching caused by contact with the cooling roller. At this point, spherulites with symmetrical structure containing nuclei are formed (FIG. 2). If heat conduction rate between cooling roller surface and the melt polyethylene resin is relatively small, the rate of crystallization is small, resulting in spherulites containing relatively small nuclei. If heat conduction rate is large, spherulites containing relatively large nuclei are formed. These nuclei in the spherulites form protrusions during stretching in TD (transverse direction) and/or MD (machine direction) in the later process. Meanwhile, spherulites appear as ring-shaped marks on polyethylene porous membrane surface (FIG. 3).

The molecular weight distribution (weight average molecular weight (Mw)/number average molecular weight (Mn)) of the polyethylene resin is preferably in the range from 5 to 200 and more preferably in the range from 10 to 100. The value of Mw/Mn within the preferable range described above facilitates extrusion of polyethylene resin solution and provides a sufficient number of protrusions. Further, when the thickness of the polyethylene porous membrane is reduced, sufficient mechanical strength is achieved. The value Mw/Mn is used as a measure of molecular weight distribution, and when this value is greater for polyethylene formed of a single component, the width of molecular weight distribution is greater. The value Mw/Mn of polyethylene formed of a single component can be adjusted as appropriate by multi-step polymerization of polyethylene. Meanwhile, the value Mw/Mn of a polyethylene mixture can be adjusted as appropriate by adjusting molecular weight or mixing ratio of each component.

The polyethylene porous membrane may be a monolayer membrane or a membrane comprising two or more layers with different molecular weights or different average micropore sizes. For a layer configuration with two or more layers, it is preferable that the molecular weight and the molecular weight distribution of the polyethylene resin in one or more outer layers satisfy the conditions described above.

2. Manufacturing Method for Polyolefin Porous Membrane

A method of manufacturing a porous membrane can be selected freely in accordance with the purpose thereof as long as the various characteristics described above are satisfied. Methods of manufacturing porous membranes include the foaming method, the phase-separation method, the melt-recrystallization method, the drawing-pore-opening method, the powder-sintering method and the like, and the phase-separation method is preferred among them from the viewpoints of homogenization of micropores and cost.

Examples of the manufacturing method according to the phase-separation method include a method comprising melting and kneading polyethylene with a forming solvent, extruding the resultant molten mixture through a die, cooling the extrudate to form a gel-like molded product, stretching the obtained gel-like molded product in one or more axes, and removing the forming solvent, to obtain a porous membrane.

Methods of manufacturing a multi-layer membrane with two or more layers can be any one of the following methods. For example, in one method, each polyethylene that configures layer a and layer b is melt-kneaded with a forming solvent and the obtained molten mixture is extruded from the respective extruders to a die, merging respective gel-sheets configuring each ingredient by co-extrusion. In another method, respective gel-sheets configuring each layer are overlapped and hot-melted. The co-extrusion method is preferred because a high inter-layer adhesive strength is easily achieved; high permeability is easily maintained because communication holes are easily formed between layers; and productivity is superior.

The method of manufacturing a polyolefin porous membrane used in the present invention will be described in detail hereinafter.

The method of manufacturing a polyolefin porous membrane used in the present invention comprises the steps of:

(a) preparing a polyethylene resin solution by adding a forming solvent to a polyethylene resin and then melt-kneading the solution;

(b) extruding the polyethylene resin solution through a die and cooling the extrudate with a cooling roller having a surface with the forming solvent thereon removed and forming a gel-like molded product;

(c) stretching the gel-like molded product in a machine direction and in a width direction to obtain a stretched and molded material;

(d) extracting and removing the forming solvent from the stretched and molded material followed by drying, to obtain a porous molded material; and (e) treating the porous molded material by heat to obtain a polyolefin porous membrane. Furthermore, the corona treatment step and the like can be optionally implemented after the steps from (a) to (e).

Each step will be described below using an example in which a polyethylene resin is used as a polyolefin resin.

(a) preparing a polyethylene resin solution by adding a forming solvent to a polyethylene resin and then melt-kneading the solution A forming solvent is not limited as long as it can dissolve polyethylene sufficiently. For example, aliphatic or cyclic hydrocarbon such as nonane, decane, undecane, dodecane, liquid paraffin and the like, or mineral oil fractions with their boiling points corresponding to these are included. A non-volatile solvent such as liquid paraffin is preferable to obtain a gel-like molded product with constant solvent content. Heat-melting is performed by stirring the polyethylene composition or homogeneously mixing polyethylene composition in the extruder at the temperature at which the polyethylene composition can be completely dissolved. Though the temperature is dependent on polymer and solvent in case of stirring the polyethylene composition in the solvent or in the extruder, it is preferably in the range from 140 to 250° C., for example.

The concentration of the polyethylene resin is preferably from 25 to 40 parts by weight and more preferably from 28 to 35 parts by weight per 100 parts by weight of the total of the polyethylene resin and the forming solvent. If the polyethylene resin concentration is within the preferable range described above, a sufficient number of the nuclei to form protrusions are formed, resulting in sufficient number of protrusions. Additionally, swell and neck-in phenomena at the outlet of the die can be suppressed as the polyethylene resin solution is extruded, and moldability and self-supporting characteristics of the extrudate are maintained.

The method of melting and kneading is not particularly limited, but normally homogeneous kneading is done in the extruder. This method is suitable for preparing the solution with a high concentration of polyethylene. The melting temperature is preferably in the range from E+10 to E+100° C., where E is the melting point of polyethylene. Generally, the melting temperature is preferably in the range from 160 to 230° C., and more preferably in the range from 170 to 200° C. The melting point herein refers to the value obtained by differential scanning calorimetry (DSC) according to JIS K 7121. The forming solvent may be added before kneading or added during the kneading from the middle of the extruder, and melt-kneaded further. Preferably, the forming solvent is added to prepare the solution before kneading. For melting and kneading, antioxidant is preferably added to prevent oxidation of polyethylene.

(b) extruding the polyethylene resin solution through a die and cooling the extrudate with a cooling roller having a surface with the forming solvent thereon removed and forming a gel-like molded product The melt-kneaded polyethylene resin solution is extruded through a die from the extruder directly or via another extruder. A die for a sheet with a rectangular mouthpiece is generally used.

The polyethylene resin solution extruded from the die is brought into contact with a rotating cooling roller, which is set to a surface temperature of from 20 to 40° C. with a refrigerant, so as to form a gel-like molded product. The extruded polyethylene resin solution is preferably cooled down to the temperature not higher than 25° C. The cooling rate in the temperature range that the crystallization practically occurs is important. For example, the polyethylene resin solution is cooled at the cooling rate not less than 10° C./sec in the temperature range that the crystallization practically occurs, and the gel-like molded product is obtained. The cooling rate is preferably not less than 20° C./sec, more preferably not less than 30° C./sec, and even more preferably not less than 50° C./sec. The cooling step described above can immobilize microphase-separated structures in which a polyethylene phase is separated by solvent, form spherulites comprising relatively large nuclei on the surface of the gel-like molded product in contact with the cooling roller and form protrusions with appropriate shapes after stretching. The cooling rate can be estimated from the simulation using parameters such as extruding temperature of the gel-like molded product, thermal conductivity of the gel-like molded product, the thickness of the gel-like molded product, and heat transfer coefficients of the forming solvent, the cooling roller and air.

Figure 4:
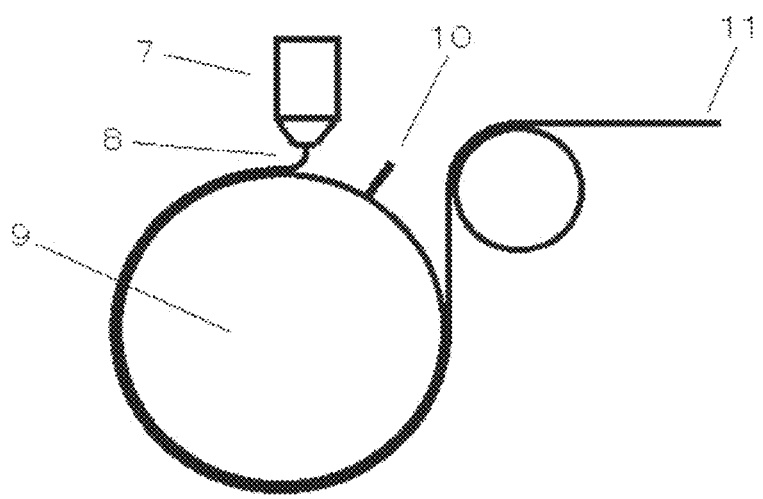
FIG. 4 is a schematic view of the steps to extrude polyethylene resin solution through a die disposed at the end of the extruder and to cool the extrudate by a cooling roller to form a gel-like molded product.

Additionally, in the present invention, it is important to remove a forming solvent deposited on the cooling roller surface, which will be in contact with the polyethylene resin solution extruded from the die, as much as possible. Namely, as illustrated in FIG. 4, the polyethylene resin solution is chilled and formed into the gel-like molded product upon contact with the rolling cooling roller and the forming solvent is present on the cooling roller surface after the formed gel-like molded product is removed from the roller. Generally, the roll surface as-is will be in contact with the polyethylene resin solution again. However, a large amount of the forming solvent deposited on the cooling roller surface has a thermal insulation effect, which decelerates the cooling rate and hinders the protrusion formation. Therefore, it is important to remove the forming solvent as much as possible before the cooling roller is brought into contact with the polyethylene resin solution again.

The means for removing the forming solvent—that is, the means for removing the forming solvent from the cooling roller—is not particularly limited, but a preferable means comprises placing a doctor blade on the cooling roller parallel to the transverse direction of the gel-like molded product and scraping off the forming solvent to the extent that the forming solvent may not be visually observable on the cooling roller surface from the point immediately after the doctor blade to the point of gel-like molded product contact. Alternatively, the forming solvent can be removed by the means comprising blowing off the forming solvent by compressed air, the means comprising pumping out the forming solvent, or the combination of these means. Among these means, the means using a doctor blade scraping off the forming solvent is preferable since it is relatively easily implemented, and the use of the two or more doctor blades instead of one is more preferable due to improvement in the effective removal of the forming solvent.

The material of the doctor blade is not particularly limited as long as it has resistance to a forming solvent. However, a resin or rubber doctor blade is preferred compared to a metal doctor blade. The metal doctor blade may possibly damage the cooling roller. Examples of the resin doctor blades include polyester, polyacetal, polyethylene doctor blades and the like.

Even if the cooling roller temperature is set to lower than 20° C., the thermal insulating effect of the forming solvent may not only fail to achieve sufficient cooling rate, but also cause roughening of the surface of the gel-like molded product due to dew formation on the cooling roller. The thickness of the polyethylene resin solution upon the extrusion is preferably not greater than 1500 μm, more preferably not greater than 1000 μm, and even more preferably not greater than 800 μm. If the thickness of the polyethylene resin solution upon the extrusion is within the range described above, it is preferable since the cooling rate of the cooling roller surface is not decelerated.

(c) stretching the gel-like molded product in a machine direction and in a width direction to obtain a stretched and molded material Next, the gel-like molded product is stretched to form a stretched and molded material. Stretching involves heating of the gel-like molded product and stretching the gel-like molded product in MD and TD at the pre-determined magnifications using usually the tenter method, roll method or combination thereof. Stretching may be simultaneous stretching (simultaneous biaxial stretching) in the machine direction and the transverse direction or may be sequential stretching. The order of the sequential stretching can be any one of the ordering between MD and TD, and stretching in MD and/or TD can be multiple steps. The stretching temperature is not higher than M+10° C., where M is the melting point of the polyolefin composition. Additionally, the magnification of the stretching is dependent on the thickness of the material, planer magnification is preferably not less than 9 times and more preferably from 16 to 400 times. In case of simultaneous biaxial stretching, stretching at an identical magnification for MD and TD, such as 3×3, 5×5 and 7×7, is preferred. The planar magnification within the preferable range described above provides sufficient stretching and results in the porous membrane with high modulus and large strength. Also, by controlling the stretching temperature, the desirable air permeation resistance can be obtained.

(d) extracting and removing the forming solvent from the stretched and molded material followed by drying, to obtain a porous molded material Next, the stretched and molded material is treated with a washing solvent to remove the residual forming solvent, and a porous membrane is thus obtained. The washing solvents that can be used are volatile solvents, and include hydrocarbons such as pentane, hexane, and heptane, chlorinated hydrocarbons such as methylene chloride and carbon tetrachloride, fluorinated hydrocarbons such as trifluoroethane, ethers such as diethylether and dioxane. These washing solvents are appropriately selected according to the forming solvent used for dissolving polyethylene, and can be used alone or in combination thereof. The washing method includes immersion and extraction in the washing solvent, showering the washing solvent, suctioning the washing solvent from the opposite side of the stretched and molded material and the combination thereof. The washing described above is repeated until the residual solvent in the stretched and molded material reaches less than 1 wt. %. After the washing, the washing solvents are dried off. The method of drying off the washing solvents includes heat drying, air-dry and the like.

(e) Treating the Porous Molded Material by Heat to Obtain a Polyethylene Porous Membrane The porous molded material obtained by drying further undergoes thermal treatment to obtain a polyethylene porous membrane. The thermal treatment temperature is preferable from 90 to 150° C. The thermal treatment temperature within the preferable range described above can achieve sufficient reduction in thermal shrinkage and air permeation resistance of the polyolefin porous membrane obtained. The residence time of the thermal treatment step is not particularly limited, but generally is not less than 1 second and not more than 10 minutes, and preferably from 3 seconds to not more than 2 minutes. The thermal treatment can be done by any of the methods among the tenter method, roll method, pressing method, or free method.

Furthermore, it is preferable to shrink the porous molded material in at least one of MD (machine direction) and TD (transverse direction), while the porous molded material is fixed in both directions, MD and TD, in the thermal treatment step. If the shrinking of the porous molded material in MD and/or TD is not performed while the porous molded material is fixed in both directions, MD and TD, the thermal shrinkage of the porous molded material may be deteriorated. The ratio of shrinking the porous molded material in at least one of MD and TD, is from 0.01 to 50%, and preferably 3 to 20%. The ratio of shrinking within the preferable range described above improves the heat shrinkage after 8 hours at 105° C. and maintains air permeation resistance.

Meanwhile, the functionalization steps such as corona treatment step or hydrophilization step can be implemented optionally after the steps (a) to (e).

3. Modified Porous Layer

The modified porous layer used in the present invention is described below.

A modified porous layer is preferably laminated on the side having protrusions of the polyolefin porous membrane. When modified porous layers are disposed on the both sides of the polyolefin porous membrane, it is preferable for the modified porous layer on the side on which parallel stress is more strongly applied due to contact with a roller, a bar, or the like during the subsequent processes such as the slit process and transport process to be laminated on the side of the polyethylene porous membrane having protrusions since the effect of the present invention can be demonstrated effectively.

The modified porous layer in the present invention has at least a fluorine-based resin and inorganic particles. The content of inorganic particles relative to the total of the fluorine-based resin and the inorganic particles in the modified porous layer is not less than 40 wt. % and less than 80 wt. %. By setting the content to this range, the electrode adhesion, heat resistance, and electrolyte permeability are achieved with good balance.

The fluorine-based resin used in the present invention is not particularly limited as long as the resin improves the electrode adhesion, heat resistance, and electrolyte permeability, but it is preferable to use one or more types selected from the group consisting of vinylidene fluoride homopolymers, vinylidene fluoride/olefin fluoride copolymers, vinyl fluoride homopolymers, and vinyl fluoride/olefin fluoride copolymers from the perspective of heat resistance and electrode adhesion. Polyvinylidene fluoride resins are particularly preferable. These polymers can sustain sufficient affinity toward electrolytic solution during use at high temperature, since they have sufficient adhesion to electrodes, great affinity toward non-aqueous electrolytic solution, appropriate heat resistance and great chemical and physical stability toward non-aqueous electrolytic solution.

A commercially available resin can be used as a polyvinylidene fluoride resin. Examples include "KF Polymer" (registered trademark) #1100, "KF Polymer" (registered trademark) W#7200, "KF Polymer" (registered trademark) W#7300, "KF Polymer" (registered trademark) W#8500, and "KF Polymer" (registered trademark) W#9300 manufactured by the Kureha Corporation, "Hylar" (registered trademark) 301F PVDF, "Hylar" (registered trademark) 460, and "Hylar" (registered trademark) 5000PVDF manufactured by Solvay Specialty Polymers Japan (Ltd.), and "KYNAR" (registered trademark) 761, "KYNARFLEX"

(registered trademark) 2800, "KYNARFLEX" (registered trademark) 2850, and "KYNARFLEX" (registered trademark) 2851 manufactured by ARKEM (Ltd.). In particular, a substance having a molecular weight of not less than 600,000 is preferable from the perspective of electrode adhesion and the peel strength between the polyolefin porous membrane and the modified porous layer.

Examples of inorganic particles include calcium carbonate, calcium phosphate, amorphous silica, crystalline glass fillers, kaolin, talc, titanium dioxide, alumina, silica-alumina conjugate oxide particles, barium sulfate, calcium fluoride, lithium fluoride, zeolite, molybdenum sulfide, mica and the like.

The average particle size of the inorganic particles is preferably not less than 1.5 times and not greater than 50 times and more preferably not less than 2.0 times and not greater than 20 times the average pore size of the polyolefin porous membrane. When the average particle size of the particles is within the preferable range described above, the pores in the polyolefin porous membrane may not be blocked even if the heat-resistant resin and the particles coexist, and the air permeation resistance can be maintained. Meanwhile, it can prevent shedding of the particles during the battery assembly process, which may cause serious failure of the battery.

Examples of the shape of the particles include a spherical shape, roughly spherical shape, plate shape, and needle shape, but the shape is not particularly limited.

In the present invention, the content of inorganic particles relative to the total of the fluorine-based resin and the inorganic particles in the modified porous layer is preferably not less than 40 wt. % and less than 80 wt. %. The upper limit of the content of these inorganic particles is more preferably 75 wt. % and even more preferably 70 wt. %. The lower limit is preferably 40 wt. % and more preferably 45 wt. %. By setting the content of the inorganic particles to a level greater than or equal to the preferable lower limit described above, curling may be reduced and dendrite formation may be suppressed. By setting the content to a level less than or equal to the preferable upper limit described above, the ratio of the functional resin to the total volume of the modified porous layer is optimized, and the adhesion to electrodes is secured.

The thickness of the modified porous layer is preferably from 1 to 5 µm, more preferably from 1 to 4 µm, and even more preferably from 1 to 3 µm. When the film thickness is not less than 1 µm, the adhesion to electrodes is secured, and it is possible to prevent the polyolefin fine porous membrane from melting and shrinking at a temperature higher than or equal to the melting point and to secure membrane puncture strength and insulation. When the film thickness is not greater than 5 µm, the proportion occupied by the polyolefin fine porous membrane is optimized so that a sufficient pore blocking function is achieved, which makes it possible to suppress abnormal reactions. In addition, it is possible to suppress the rolled volume, which is suited to future increases in battery volume. Furthermore, this prevents the curling from increasing, which leads to improved productivity in the battery assembly step.

The porosity of the modified porous layer is preferably from 30 to 90%, and more preferably from 40 to 70%. When the porosity is not less than 30%, it is possible to prevent increases in the electrical resistance of the membrane and to allow a large current to flow through the membrane. On the other hand, when the porosity is not more than 90%, it is possible to maintain the membrane strength. The desired porosity can be achieved by appropriately adjusting the inorganic particle concentration, the binder concentration, and the like. When the porosity of the modified porous layer is within the preferable range described above, a laminated porous membrane obtained by laminating the modified porous layer has low electrical resistance and exhibits increase in electrical current. In addition, the membrane strength can be maintained.

The upper limit of the total thickness of the battery separator obtained by laminating the modified porous layer is preferably 30 µm and more preferably 25 µm. The lower limit is preferably 5 µm and more preferably 7 µm. By setting the thickness of the entire battery separator greater than or equal to the preferable lower limit described above, it is possible to ensure sufficient mechanical strength and insulation. By setting the thickness less than or equal to the upper limit described above, it is possible to ensure an electrode area that can be charged inside the container, which makes it possible to avoid decreases in capacity.

4. Lamination Method for Modified Porous Layer

The lamination method of the modified porous layer will be described hereinafter. A modified porous layer is obtained by laminating a varnish primarily comprising particles and a fluorine-based resin solution dissolved by a solvent, which is capable of dissolving the fluorine-based resin and miscible with water, on the polyolefin fine porous membrane obtained above using a coating method, placing the membrane in a specific humidified environment, phase-separating fluorine-based resin and the solvent which is miscible with water, and then placing the product in a water bath (coagulation bath) so as to coagulate the fluorine-based resin.

Examples of the method of coating the varnish include a dip coating method, a reverse roll coating method, a gravure coating method, a kiss coating method, a roll brush method, a spray coating method, an air knife coating method, a Meyer-bar coating method, a pipe doctor method, a blade coating method and a die coating method, and these methods can be used alone or in combination thereof. It is important for the varnish to be stored in an airtight state to prevent the varnish from coming into contact with outside air as much as possible until the time of coating.

In the coagulation bath, the fluorine-based resin component is coagulated in a three-dimensional mesh-like pattern. The duration for immersing in the coagulating bath is preferably not less than 3 seconds. When the time is less than 3 seconds, the resin component may not be coagulated sufficiently. Though the upper limit is not particularly limited, 10 seconds is sufficient. Furthermore, the porous membrane prior to washing is immersed in an aqueous solution containing a good solvent for the fluorine-based resin constituting the modified porous layer in an amount of from 1 to 20 wt. % and preferably from 5 to 15 wt. %, and the final battery separator can be obtained via a washing step using purified water and a drying step using hot air of a temperature not higher than 100° C.

General methods such as warming, ultrasonic irradiation or bubbling can be used for washing to remove the solvent. Furthermore, to maintain the concentration of each bath constant and improve washing efficiency, a method of removing a solution inside the fine porous membrane between baths is effective. Specific examples thereof include a method of forcing out a solution within a porous layer by air or an inert gas and a method of physically squeezing out a solution within a membrane by a guide roll.

5. Battery Separator

It is desirable to store the battery separator of the present invention in a dry state. However, if storage in an absolute dry state is difficult, the battery separator is preferably subjected to a vacuum drying treatment at the temperature not higher than 100° C. just before use. The battery separator of the present invention can be used as a battery separator for nickel-hydrogen batteries, nickel-cadmium batteries, nickel-zinc batteries, silver-zinc batteries, rechargeable batteries such as lithium ion rechargeable batteries and lithium polymer rechargeable batteries, and the like, but the battery separator is particularly preferably used as a separator for a lithium ion rechargeable battery.

The air permeation resistance of the battery separator is one of the most important characteristics and preferably ranges from 50 to 600 sec/100 ccAir, more preferably from 100 to 500 sec/100 ccAir, and even more preferably from 100 to 400 sec/100 ccAir. The desired air permeation resistance is achieved by adjusting the porosity of the modified porous layer and adjusting the degree of penetration of the binder into the polyolefin porous membrane. When the air permeation resistance of the battery separator is within the preferable range described above, sufficient electrical insulation can be achieved and clogging, shorting and membrane puncture can be avoided. In addition, reduction in the membrane electrical resistance can achieve charge/discharge characteristics and battery life characteristics within the range of practical use.

WORKING EXAMPLES

The present invention will be described specifically using working examples hereinafter, but the present invention is not limited by these examples in any way. The measurement values in the working examples are the values measured by the methods described below.

1. Electrode Adhesion

An anode (negative electrode) and a battery separator were each cut out to a size of 2 cm×5 cm, and the active substance surface of the anode and the modified porous layer surface of the battery separator were aligned with one another and pressed together for 3 minutes under a pressure of 2 MPa while maintaining a temperature of 50° C. on the surface to be adhered. The anode and the battery separator were then peeled, and the peeled surface was observed and evaluated in accordance with the following criteria. A coated electrode A100 (1.6 mAh/cm$^2$) manufactured by Piotrek (Inc.) was used as an anode.

Excellent: at least 70% of the active substance of the anode adheres to the modified porous layer of the battery separator in terms of the area ratio
Good: at least 60% but less than 70% of the active substance of the anode adheres to the modified porous layer of the battery separator in terms of the area ratio
Poor: less than 60% of the active substance of the anode adheres to the modified porous layer of the battery separator in terms of the area ratio 2. Number of Protrusions The numbers and sizes of the protrusions were measured using a confocal microscope (HD100, manufactured by Lasertec Corporation) placed on a vibration isolation platform after the light source thereof was stabilized.

Steps
(1) On the surface of the polyethylene porous membrane obtained by working examples or comparative examples, the surface being the one in contact with the cooling roller during the manufacturing, a square frame of 1 cm×1 cm in size was drawn with a fine-point permanent marker.
(2) The sample was placed on the sample stage with the surface with the drawn square up, and was fixed firmly to the sample stage using the electrostatic adhesion apparatus, the accessory of the confocal microscope.
(3) Using the objective lens with magnification of 5 times, a ring-shaped mark originating from a polyethylene spherulite as in FIG. 3 was displayed on the monitor as a two-dimensional image (called REAL screen for this microscope), and the position of the sample stage was adjusted so that the darkest part of the ring-shaped mark was approximately at the center of the monitor screen. When two ring-shaped marks were connected, the stage was adjusted so that a point of contact was at the center of the monitor screen. The protrusion height was measured only for the ring-shaped mark originating from the polyethylene spherulite with its major axes not less than 0.2 mm. The major axis length of a ring-shaped mark was measured by reading the length between two ends of the ring-shaped mark using a cursor on the two-dimensional image described above.
(4)
Changing the objective lens to the one with magnification of 20 times, the reference height (called REF SET in this microscope) was set to the height when the focus was adjusted to the center area of the monitor screen (so that the center area of the monitor screen was displayed most brightly in this microscope).
(5)
The measurement range in the height direction was set to 15 μm up and down relative to the reference height as 0 μm described above. Also, the scan time was 120 seconds, STEP transport distance was 0.1 μm/Step and the three-dimensional data was acquired.
(6)
After the acquisition of the three-dimensional data, the image for data processing (Z image in this microscope) was displayed and smoothing process was applied (the conditions for smoothing are: size of filter: 3×3, matrix type: SMOOTH3-0, number of processes: 1). In addition, plane correction was applied optionally in the plane correction window as necessary.
(7)
The cursor was positioned horizontally on the position intersecting the highest protrusion in the image for data processing (the brightest position) and the cross-sectional profile corresponding to the cursor was displayed on the cross-sectional profile image.
(8)
The protrusion size was measured by positioning the two vertical cursors to the inflection points at each side of the skirt of the protrusion in the cross-sectional profile image, and was defined as the distance between the two cursors.
(9)
The protrusion height was measured by positioning the two horizontal cursors to the peak of the protrusion and the inflection points at each side of the skirt of the protrusion (the lower inflection point if the two inflection points at each side of the skirt of the protrusion were different in height), and was defined as the distance between two cursors.
(10)
The operation described above was repeated inside the square of 1 cm×1 cm described above, and the protrusions with size not less than 5 μm and not greater than 50 μm, and with height not less than 0.5 μm and not greater than 3.0 μm, were counted. The number of the protrusions per 1 cm$^2$ was thus obtained, and the average height of the protrusions was obtained.

3. 0° Peel Strength of Modified Porous Layer (N/15 mm)

FIG. 1 schematically illustrates the evaluation method. The reference numeral 1 denotes a laminated sample, 2 denotes a polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, which was 50 mm×25 mm in size and 0.5 mm in thickness, a piece of double-sided adhesive tape 4 (NW-K50, manufactured by Nichiban) of the same size thereof was adhered. The surface of the polyolefin porous membrane 2 side of the sample 1 (laminated porous membrane), which was cut out in a size of 50 mm in width and 100 mm in length, was adhered to the aluminum plate 5 so that a 40 mm portion of the sample, as measured from one of the 25 mm long edges of the aluminum plate 5, was overlapped and adhered together, and the protruding portion was cut out. Next, a double-sided adhesive tape was adhered on one side of the aluminum plate 5', 100 mm in length, 15 mm in width and 0.5 mm in thickness. And the 20 mm portion of the sample, measured from one of the 25 mm long edges of the aluminum plate 5, was overlapped and adhered together. Then, the aluminum plate 5 and the aluminum plate 5', which interposed the sample, were attached to the tensile tester (Autograph AGS-J1 kN, manufactured by Shimadzu Corp., load cell capacity: 1 kN), and the load was applied on the aluminum plate 5 and the aluminum plate 5' in parallel but in opposite directions, at a tensile velocity of 10 mm/min, and the strength at which the modified porous layer was delaminated was measured. The measurement was performed for any three points separated not less than 30 cm from each other in the longitudinal direction, and the average value thereof was recorded as the 0° peel strength of the modified porous layer.

4. Membrane Thickness

The membrane thickness was obtained by averaging measurements of 20 points using a contact-type membrane thickness meter (Litematic series 318, manufactured by Mitutoyo Corp.). An ultrahard spherical contact point of φ9.5 mm was used and measurements were done at 0.01 N measuring force.

5. Scratch Resistance

Both edges of the rolled laminated porous membranes obtained in the working examples and comparative examples were subjected to slit processing while being unrolled. The slit process was carried out by a slitter (Type WA177A, manufactured by Nishimura Seisakusho Corp.), under the condition of velocity of 20 m/min and tensile force of 60 N/100 mm. For the rolls which had contacts with the coated surface during the process, two hard chrome plated rolls (both were free rolls) were used. Next, while winding back the rolled laminated porous membrane after the slit process, delaminated defects equal to or greater than 0.5 mm in the major axis were counted under visual observation using a magnifying glass of 10 times magnification with a scale (PEAK SCALE LUPE ×10). The results were evaluated according to the criteria below. The area of evaluation was 100 mm in width and 500 mm in length. (If the width was less than 100 mm, the evaluation length was adjusted so that the total evaluation area was same.)

Evaluation Criteria

○ (Exceptionally Good:) not more than 5
Δ (Good) from 6 to 15
X (Poor): not less than 16

Working Example 1

A polyethylene composition (melting point 135° C.) was obtained by addition of 0.375 parts by weight of an antioxidant to 100 parts by weight of a composition (Mw/Mn=16.0), which comprises 2 wt. % of ultra-high molecular weight polyethylene (UHMWPE) with the weight average molecular weight of 2,000,000 and 98 wt. % of high density polyethylene (HDPE) with the weight average molecular weight of 350,000. 30 parts by weight of the polyethylene composition was introduced into a biaxial extruder. Through the side-feeder of the biaxial extruder, 70 parts by weight of liquid paraffin was supplied, and melt-kneaded to prepare a polyethylene resin solution inside the extruder. This was followed by extruding the polyethylene resin solution through the die disposed at the end of the extruder at 190° C. and forming a gel-like molded product while drawing the product out with a cooling roller 800 mm in diameter with an internal cooling water temperature which was kept at 25° C. During this operation, a piece of polyester doctor blade was placed in contact with the cooling roller at the point between the point the gel-like molded product departing from the cooling roller and the point polyethylene resin solution extruded from the die contacting with the cooling roller, parallel to the transverse direction of the gel-like molded product, and scraped off the liquid paraffin deposited on the cooling roller surface. Subsequently, the gel-like molded product was stretched by simultaneous biaxial stretching at the magnification of 5×5, under temperature control to obtain the desired air permeation resistance, and the stretched and molded material was obtained. The stretched and molded material obtained was washed with methylene chloride to extract and remove residual liquid paraffin, dried and a porous molded material was obtained. Then, the porous molded product was fixed on a tenter, shrunk by 10% only in TD (the transverse direction), and subjected to heat treatment at 90° C. for 3 seconds. The polyethylene porous membrane with a thickness of 9 μm, porosity of 45%, average pore size of 0.15 μm and air permeation resistance of 240 sec/100 ccAir was obtained.

(Varnish Preparation)

A polyvinylidene fluoride/hexafluoropropylene copolymer (PVdF/HFP=92/8 (weight ratio)) having a weight average molecular weight of 1,000,000 was used as a fluorine-based resin. The fluorine-based resin, alumina particles having an average particle size of 0.5 μm, and N-methyl-2-pyrrolidone were mixed at a weight ratio of 5:12:83, respectively, and after the resin component was dissolved, the mixture was introduced into a polypropylene container with zirconia oxide beads (trade name: Torayceram (registered trademark) beads, manufactured by Toray Industries, diameter: 0.5 mm) and dispersed for 6 hours using a paint-shaker (manufactured by Toyo Seiki Seisakusho). Next, the varnish (a) was obtained by filtering through a filter having a filtration limit of 5 The weight ratio of the fluorine-based resin (solid content) and the particles was 29:71. In addition, the varnish was stored in an airtight state to prevent the varnish from coming into contact with outside air as much as possible until the time of coating.

(Lamination of Modified Porous Layer)

The varnish (a) was applied to the surface of the polyolefin fine porous membrane in contact with the cooling roller by the Meyer bar coating method and then passed through a humidifying zone with a temperature of 25° C. and an absolute humidity of 12 g/m³ for 5 seconds. Next, the treated membrane was introduced into an aqueous solution (coagulation bath) containing 5 wt. % of N-methyl-2-pyrrolidone, and after the treated membrane was washed with purified water, it was dried by passing the membrane through a hot-air drier at 70° C. to obtain a battery separator with a final thickness of 11 μm.

Working Example 2

A battery separator was obtained in the same manner as Working Example 1, except that the compounding ratio of the ultra-high molecular weight polyethylene (UHMWPE) with the weight average molecular weight of 2,000,000 and the high density polyethylene (HDPE) with the weight average molecular weight of 350,000 was changed to 10:90 (wt. % ratio).

Working Example 3

A battery separator was obtained in the same manner as Working Example 1, except that the compounding ratio of the ultra-high molecular weight polyethylene (UHMWPE) with the weight average molecular weight of 2,000,000 and the high density polyethylene (HDPE) with the weight average molecular weight of 350,000 was changed to 20:80 (wt. % ratio).

Working Example 4

A battery separator was obtained in the same manner as Working Example 1, except that the compounding ratio of the ultra-high molecular weight polyethylene (UHMWPE) with the weight average molecular weight of 2,000,000 and the high density polyethylene (HDPE) with the weight average molecular weight of 350,000 was changed to 30:70 (wt. % ratio).

Working Example 5

A battery separator was obtained in the same manner as Working Example 1, except that the compounding ratio of the ultra-high molecular weight polyethylene (UHMWPE) with the weight average molecular weight of 2,000,000 and the high density polyethylene (HDPE) with the weight average molecular weight of 350,000 was changed to 40:60 (wt. % ratio).

Working Example 6

A battery separator was obtained in the same manner as in Working Example 1 with the exception that two pieces of polyester doctor blades were disposed to contact with the cooling roller at the interval of 20 mm.

Working Example 7

A battery separator was obtained in the same manner as in Working Example 1 with the exception that three pieces of polyester doctor blades were disposed to contact with the cooling roller at an interval of 20 mm from each other.

Working Example 8

A battery separator was obtained in the same manner as in Working Example 1 with the exception of using a varnish (b) prepared by mixing a fluorine-based resin, alumina particles having an average particle size of 0.5 μm, and N-methyl-2-pyrrolidone at a weight ratio of 10:7:83, respectively. The weight ratio of the fluorine-based resin (solid content) and the particles was 59:41.

Working Example 9

A battery separator was obtained in the same manner as in Working Example 1 with the exception of using a varnish (c) prepared by mixing a fluorine-based resin, alumina particles having an average particle size of 0.5 μm, and N-methyl-2-pyrrolidone at a weight ratio of 4:13:83, respectively. The weight ratio of the fluorine-based resin (solid content) and the particles was 24:76.

Working Example 10

A battery separator was obtained in the same manner as Working Example 1 with the exception that a varnish (d) using polyvinylidene fluoride (weight average molecular weight: 630,000) was instead used as a fluorine-based resin.

Working Example 11

A battery separator was obtained in the same manner as Working Example 1 with the exception that a varnish (e) using polyvinylidene fluoride (weight average molecular weight: 1,000,000) was instead used as a fluorine-based resin.

Working Example 12

The Meyer bar coating method was replaced with the dip coating method, and the membrane was laminated on both surfaces of the polyolefin fine porous membrane to a thickness of 2 μm on each side after drying so as to obtain a battery separator with a final thickness of 13 μm.

Working Example 13

A battery separator was obtained in the same manner as Working Example 1 with the exception that the internal cooling water temperature of the cooling roller was kept at 35° C.

Working Example 14

A battery separator with the final thickness of 22 μm was obtained in the same manner as Working Example 1 with the exception that the polyethylene porous membrane with the thickness of 20 μm was obtained by adjusting the extrusion volume of the polyethylene resin solution.

Working Example 15

A battery separator was obtained in the same manner as Working Example 1, except that the 26 parts by weight of polyethylene composition was introduced into the biaxial extruder and 74 parts by weight of liquid paraffin was supplied through the side-feeder of the biaxial extruder.

Working Example 16

A battery separator was obtained in the same manner as Working Example 1 with the exception that the 35 parts by weight of a polyethylene composition was introduced into the biaxial extruder and 65 parts by weight of liquid paraffin was supplied through the side-feeder of the biaxial extruder.

Working Example 17

A battery separator was obtained in the same manner as in Working Example 1 with the exception that a coating solution (f) using titanium oxide particles (average particle size: 0.38 μm) instead of alumina particles was used.

Working Example 18

A battery separator was obtained in the same manner as in Working Example 1 with the exception that a coating solution (g) using boehmite particles (average particle size: 1.0 μm) instead of alumina particles was used.

Comparative Example 1

A battery separator was obtained in the same manner as Working Example 1, except that the liquid paraffin deposited on the cooling roller was not scraped off by the doctor blade upon obtaining the gel-like molded product by cooling the polyethylene resin solution extruded from the die on the cooling roller.

Comparative Example 2

A battery separator was obtained in the same manner as Working Example 1 with the exception that the polyethylene composition (melting point 135° C.) obtained by adding 0.375 parts by weight of an antioxidant to 100 parts by weight of the composition (Mw/Mn=16.0) comprising 100 wt. % of high density polyethylene (HDPE) with weight average molecular weight of 350,000 was used.

Comparative Example 3

A battery separator was obtained in the same manner as Working Example 1 with the exception that the internal cooling water temperature of the cooling roller was kept at 0° C. and the doctor blade was not used.

Comparative Example 4

A battery separator was obtained in the same manner as Working Example 1 with the exception that the polyethylene resin solution was immersed in water and kept at 25° C. for 1 minute instead of the cooling polyethylene resin solution extruded from the die by the cooling roller.

Comparative Example 5

50 parts by weight of the polyethylene composition used in the Working Example 1 was introduced into the biaxial extruder, 50 parts by weight of liquid paraffin was supplied through the side-feeder of the biaxial extruder, and melt-kneaded to prepare a polyethylene resin solution in the extruder. Extrusion of the polyethylene solution was attempted, but a homogeneous membrane was not obtained.

Comparative Example 6

A battery separator was obtained in the same manner as Working Example 1 with the exception that the internal cooling water temperature of the cooling roller was kept at 50° C.

Comparative Example 7

A battery separator was obtained in the same manner as Working Example 1 with the exception of using a varnish (h) prepared by mixing a fluorine-based resin, alumina particles having an average particle size of 0.5 μm, and N-methyl-2-pyrrolidone at a weight ratio of 2:15:83, respectively. The weight ratio of the fluorine-based resin (solid content) and the particles was 12:88.

Comparative Example 8

In a four-necked flask equipped with a thermometer, a condenser and a nitrogen gas introducing tube, 1 mol of a trimellitic anhydride (TMA), 0.8 mol of o-tolidine diisocyanate (TODI), 0.2 mol of 2,4-tolidine diisocyanate (TDI) and 0.01 mol of potassium fluoride were introduced together with N-methyl-2-pyrrolidone to form a solid concentration of 14%, and the mixture was stirred at 100° C. for 5 hours. The mixture was then diluted with N-methyl-2-pyrrolidone to the solid concentration of 14% to synthesize a polyamideimide resin solution.

The polyamideimide resin solution, alumina particles of the average particle size of 0.5 μm, and N-methyl-2-pyrrolidone were mixed at the weight ratio of 34:12:54, respectively, introduced into a polypropylene container with zirconia oxide beads ("Torayceram" (registered trademark), manufactured by Toray Industries, size 0.5 mm), and dispersed for 6 hours using a paint-shaker (manufactured by Toyo Seiki Seisakusho). Next, the coating solution (i) was obtained by filtering through a filter having a filtration limit of 5 μm. The coating solution (i) was applied in the same manner as in Working Example 1 to a polyolefin porous membrane obtained in the same manner as in Working Example 1 so as to obtain a battery separator having a final thickness of 11 μm. The weight ratio of the polyamide resin (solid content) and the particles was 26:74.

Comparative Example 9

A battery separator was obtained in the same manner as in Working Example 1 with the exception of using a varnish (j) prepared by mixing a fluorine-based resin, alumina particles having an average particle size of 0.5 μm, and N-methyl-2-pyrrolidone at a weight ratio of 11:6:83, respectively. The weight ratio of the fluorine-based resin (solid content) and the particles was 65:35. The heat resistance was poor.

The characteristics of the battery separators obtained in Working Examples 1 to 18 and Comparative Examples 1 to 9 are shown in Table 1.

TABLE 1

| | Conditions | | | | | | | | |
|---|---|---|---|---|---|---|---|---|---|
| | UHMWPE (wt. %) | HDPE (wt. %) | Resin Concentration (Parts By Weight) | Cooling roller temperature (° C.) | Scraping off the forming solvent (Number of Blades) | Coating solution | Inorganic particles | Content of inorganic particles relative to the total of the fluorine-based resin and the inorganic particles (w %) | Weight average molecular weight of fluorine-based resin (×10000) |
| Working Example 1 | 2 | 98 | 30 | 25 | 1 | a | Alumina | 71 | 100 |
| Working Example 2 | 10 | 90 | 30 | 25 | 1 | a | Alumina | 71 | 100 |

TABLE 1-continued

| | UHMWPE (wt. %) | HDPE (wt. %) | Resin Concentration (Parts By Weight) | Cooling roller temperature (° C.) | Scraping off the forming solvent (Number of Blades) | Coating solution | Inorganic particles | Content of inorganic particles relative to the total of the fluorine-based resin and the inorganic particles (w %) | Weight average molecular weight of fluorine-based resin (×10000) |
|---|---|---|---|---|---|---|---|---|---|
| Working Example 3 | 20 | 80 | 30 | 25 | 1 | a | Alumina | 71 | 100 |
| Working Example 4 | 30 | 70 | 30 | 25 | 1 | a | Alumina | 71 | 100 |
| Working Example 5 | 40 | 60 | 30 | 25 | 1 | a | Alumina | 71 | 100 |
| Working Example 6 | 2 | 98 | 30 | 25 | 2 | a | Alumina | 71 | 100 |
| Working Example 7 | 2 | 98 | 30 | 25 | 3 | a | Alumina | 71 | 100 |
| Working Example 8 | 2 | 98 | 30 | 25 | 1 | b | Alumina | 41 | 100 |
| Working Example 9 | 2 | 98 | 30 | 25 | 1 | c | Alumina | 76 | 100 |
| Working Example 10 | 2 | 98 | 30 | 25 | 1 | d | Alumina | 71 | 63 |
| Working Example 11 | 2 | 98 | 30 | 25 | 1 | e | Alumina | 71 | 100 |
| Working Example 12 | 2 | 98 | 30 | 25 | 1 | a | Alumina | 71 | 100 |
| Working Example 13 | 2 | 98 | 30 | 35 | 1 | a | Alumina | 71 | 100 |
| Working Example 14 | 2 | 98 | 30 | 25 | 1 | a | Alumina | 71 | 100 |
| Working Example 15 | 2 | 98 | 26 | 25 | 1 | a | Alumina | 71 | 100 |
| Working Example 16 | 2 | 98 | 35 | 25 | 1 | a | Alumina | 71 | 100 |
| Working Example 17 | 2 | 98 | 30 | 25 | 1 | f | Titanium oxide | 71 | 100 |
| Working Example 18 | 2 | 98 | 30 | 25 | 1 | g | Plate-like boehmite | 71 | 100 |
| Comparative Example 1 | 2 | 98 | 30 | 25 | 0 | a | Alumina | 71 | 100 |
| Comparative Example 2 | 0 | 100 | 30 | 25 | 1 | a | Alumina | 71 | 100 |
| Comparative Example 3 | 2 | 98 | 30 | 0 | 0 | a | Alumina | 71 | 100 |
| Comparative Example 4 | 2 | 98 | 30 | 25° C. (water bath) | — | a | Alumina | 71 | 100 |
| Comparative Example 5 | 2 | 98 | 50 | — | — | — | — | — | — |
| Comparative Example 6 | 2 | 98 | 30 | 50 | 1 | a | Alumina | 71 | 100 |
| Comparative Example 7 | 2 | 98 | 30 | 25 | 1 | h | Alumina | 88 | 100 |
| Comparative Example 8 | 2 | 98 | 30 | 25 | 1 | i | Alumina | 74 | 100 |
| Comparative Example 9 | 2 | 98 | 30 | 25 | 1 | j | Alumina | 35 | 100 |

TABLE 2

| | Polyolefin Porous Membrane Thickness (μm) | Number of Protrusions (protrusions/cm$^2$) | Average Protrusion Height (μm) | 0° Peel Strength (N/15 mm) | Electrode adhesion | Scratch Resistance |
|---|---|---|---|---|---|---|
| Working Example 1 | 9 | 14 | 2.8 | 185 | Exceptionally Good | ○ |
| Working Example 2 | 9 | 17 | 1.1 | 182 | Exceptionally Good | ○ |

TABLE 2-continued

| | Characteristics | | | | | |
|---|---|---|---|---|---|---|
| | Polyolefin Porous Membrane Thickness (μm) | Number of Protrusions (protrusions/cm²) | Average Protrusion Height (μm) | 0° Peel Strength (N/15 mm) | Electrode adhesion | Scratch Resistance |
| Working Example 3 | 9 | 19 | 0.8 | 178 | Exceptionally Good | ○ |
| Working Example 4 | 9 | 42 | 0.6 | 182 | Exceptionally Good | ○ |
| Working Example 5 | 9 | 126 | 0.5 | 161 | Exceptionally Good | ○ |
| Working Example 6 | 9 | 16 | 2.9 | 194 | Exceptionally Good | ○ |
| Working Example 7 | 9 | 17 | 2.9 | 199 | Exceptionally Good | ○ |
| Working Example 8 | 9 | 14 | 2.8 | 191 | Exceptionally Good | ○ |
| Working Example 9 | 9 | 14 | 2.8 | 155 | Good | ○ |
| Working Example 10 | 9 | 14 | 2.8 | 140 | Good | ○ |
| Working Example 11 | 9 | 14 | 2.8 | 175 | Good | ○ |
| Working Example 12 | 9 | 14 | 2.8 | 180 | Exceptionally Good | ○ |
| Working Example 13 | 9 | 12 | 2.8 | 182 | Exceptionally Good | ○ |
| Working Example 14 | 20 | 12 | 2.9 | 182 | Exceptionally Good | ○ |
| Working Example 15 | 9 | 11 | 2.5 | 182 | Exceptionally Good | ○ |
| Working Example 16 | 9 | 19 | 2.9 | 188 | Exceptionally Good | ○ |
| Working Example 17 | 9 | 14 | 2.8 | 170 | Exceptionally Good | ○ |
| Working Example 18 | 9 | 14 | 2.8 | 192 | Exceptionally Good | ○ |
| Comparative Example 1 | 9 | 0 | — | 103 | Exceptionally Good | x |
| Comparative Example 2 | 9 | 0 | — | 102 | Exceptionally Good | x |
| Comparative Example 3 | 9 | 0 | — | 100 | Exceptionally Good | x |
| Comparative Example 4 | 9 | 2 | 0.6 | 104 | Exceptionally Good | Δ |
| Comparative Example 5 | — | — | — | — | Fail | — |
| Comparative Example 6 | 9 | 0 | — | 110 | Exceptionally Good | x |
| Comparative Example 7 | 9 | 14 | 2.8 | 15 | Fail | ○ |
| Comparative Example 8 | 9 | 14 | 2.8 | 190 | Fail | ○ |
| Comparative Example 9 | 9 | 14 | 2.8 | 190 | Exceptionally Good | ○ |

REFERENCE SIGNS LIST

1 Laminated porous membrane
2 Polyolefin porous membrane
3 Modified porous layer
4 Double-sided adhesive tape
5 Aluminum plate
5' Aluminum plate
6 Polyethylene spherulite nucleus
7 Die
8 Polyolefin resin solution
9 Cooling roller
10 Doctor blade
11 Gel-like molded product

The invention claimed is:

1. A battery separator comprising:
   a polyolefin porous membrane, comprising a plurality of protrusions comprising a polyolefin formed at locations corresponding to locations of crystallized spherulites, wherein the protrusions are interspersed randomly on at least one surface of the polyolefin porous membrane at a density of not less than 3 protrusions/cm² and not greater than 200 protrusions/cm², wherein the protrusions have a size W, wherein 5 μm≤W≤50 wherein the protrusions have a height H, wherein 0.5 μm≤H; and
   a modified porous layer, comprising:
      a fluorine-based resin, and
      a plurality of inorganic particles laminated on the at least one surface of the polyolefin porous membrane, wherein a concentration of the inorganic particles is not less than 40 wt. % and is less than 80 wt. %.

2. The battery separator according to claim 1, wherein a thickness of the polyolefin porous membrane is not greater than 25 μm.

3. The battery separator according to claim, wherein the inorganic particles comprise at least one of calcium carbonate, alumina, titania, barium sulfate, and boehmite.

4. The battery separator according to claim 1, wherein the battery separator is included in a lithium ion rechargeable battery.

\* \* \* \* \*